United States Patent [19]

Candelaria

[11] 4,080,020
[45] Mar. 21, 1978

[54] CYCLE SAFETY COVER AND LOCKER DEVICE

[76] Inventor: Arthur R. Candelaria, 1820 Britt NE., Albuquerque, N. Mex. 87112

[21] Appl. No.: 719,688

[22] Filed: Sep. 2, 1976

[51] Int. Cl.² ............... A47B 81/00; E05B 73/00
[52] U.S. Cl. ................... 312/100; 52/DIG. 14
[58] Field of Search ............ 312/100, 22, 27; 211/5; 70/234, 235; 52/DIG. 14, 66, 79.4, 236.1; 25/1, 16, 18 D, 56

[56] References Cited

U.S. PATENT DOCUMENTS

| | | | |
|---|---|---|---|
| 2,648,932 | 8/1953 | Dixon | 312/100 |
| 3,353,310 | 11/1967 | Ruhle | 52/66 |
| 3,479,104 | 11/1969 | Kobryner | 312/100 |
| 3,827,773 | 8/1974 | Aiello | 70/234 |
| 3,989,327 | 6/1975 | Candelaria | 312/100 |

FOREIGN PATENT DOCUMENTS 863,653  3/1961  United Kingdom .......... 52/DIG. 14

Primary Examiner—Casmir A. Nunberg
Attorney, Agent, or Firm—Armstrong, Nikaido, Marmelstein & Kubovcik

[57] ABSTRACT

A locker device and cycle cover designed to accommodate various types of cycle-type vehicles, whether motorized or not, and designed to accommodate all shapes and sizes of such cycles including safety equipment and related paraphernalia and including a locker in the form of a hollow container with sides, ends, top, bottom and openings with a means attached thereto for securing the cycle to the locker and for covering the same and a means for securing the locker to the surface upon which it is located, and particularly the employment of angular portions around the periphery of the door and opening to the locker to render the same substantially entry-proof when ordinary pry tools are employed.

4 Claims, 10 Drawing Figures

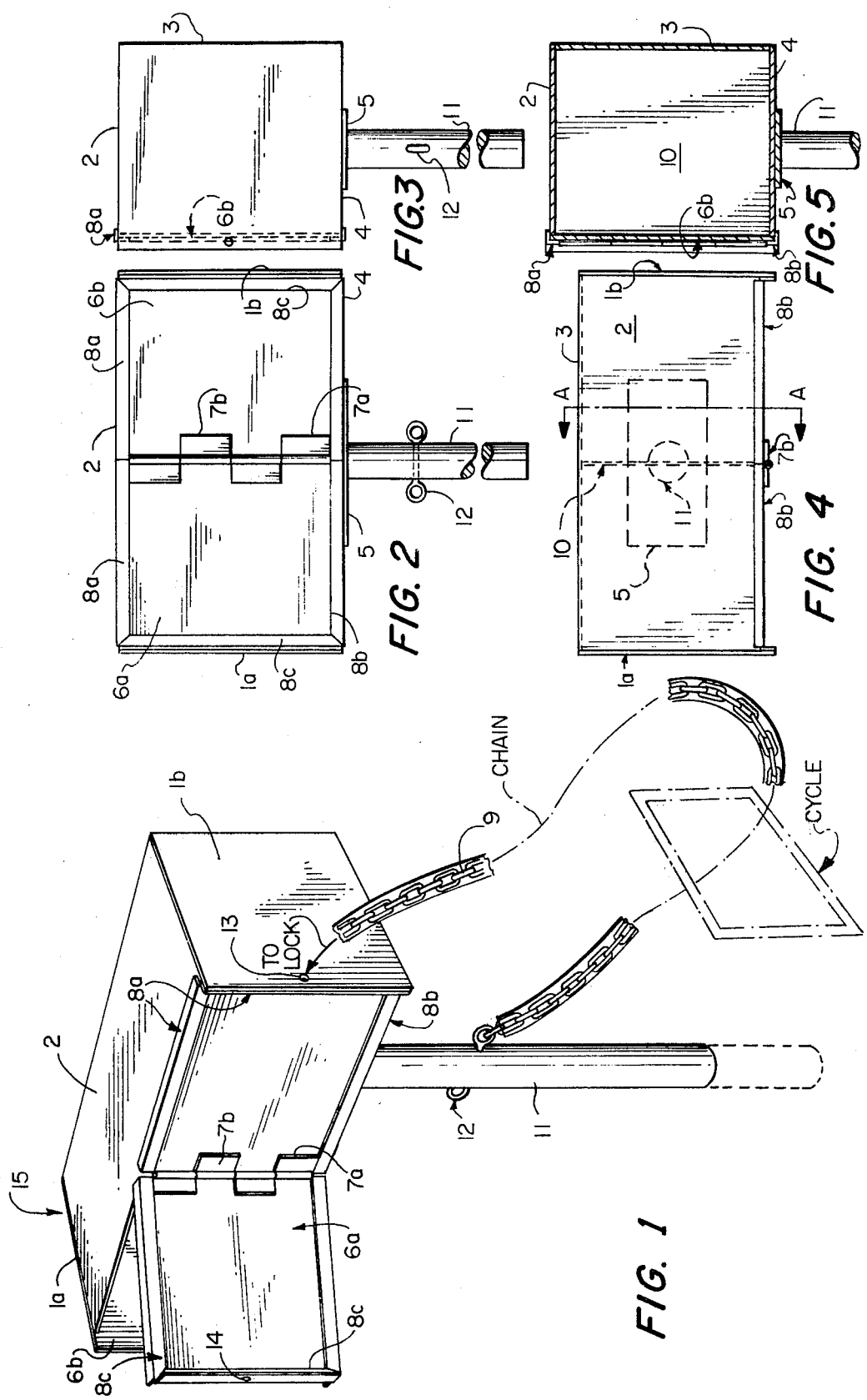

CYCLE SAFETY COVER AND LOCKER DEVICE

BACKGROUND OF THE INVENTION

The popularity of bicycles and motorcycles and similar vehicles has increased greatly with their use being not only for convenience, sport and the like, but also for necessity. Due to the character of these vehicles, security has become a great problem when they are parked and left by their owners or operators for any given period of time.

Additionally, there has been a long existing need for a mechanism to protect bicycles and motorcycles when they are parked not only as a security measure but with regard to the elements.

Moroever, another problem which has arisen has been the need to store small articles of personal belongings or the like which the rider or owner of the vehicles might not wish to carry with him when he leaves the vehicle. These such items would include helmets, gloves and small purchases being carried on the vehicle.

While devices have been created to overcome these problems, such as that set forth in applicant's U.S. Pat. No. 3,989,327, they have been deficient and wanting in several respects and particularly with regard to the security aspect since, prior devices have been susceptible to entry through the use of common tools carried in automobiles and the like such as screwdrivers, pliers, wrenches and the like.

In the past, a variety of devices developed to meet and overcome the difficulties encountered with regard to convenience and security for the owner and operators of cycle-type vehicles have failed to alleviate the problem.

Attempts to remedy the defects and drawbacks from the past and to overcome the difficulties and problems which have been encountered include the use of poles, racks, retainers and other such devices. However, none of these devices has ever overcome, to any satisfactory degree, the security problem of entry with common minor tools nor have they combined such a security feature with the conveniences outlined above.

Locker and cover constructions of various types have been used for many years in a variety of locations including bus terminals, airline terminals and related places. However, it is anticipated that the locker and cover of the present invention will be located principally outdoors and, particularly, in parking lots and other similar places designed for the mass location of cycle-type vehicles. This not only makes the need for convenience greater but also the need for security much greater due to the increased availability of such a location to those who might wish to do damage or harm to the property of the cycle owner.

Therefore, it is the primary object of the present invention to provide a device which overcomes the problems and deficiencies associated with past locker devices and particularly to provide such a device which will be tamper proof against the common minor tools used for such purposes and also to provide a device which will be, as well, convenient for the storage of personal items as well as the locking of the cycle itself.

Another object of the present invention is to provide a locker device which includes a locker with at least one door, an opening, bottom, top, sides and ends as well as a means for anchoring the same into whatever surface it is located upon, all with a design toward maximum security against tampering as well as combining this feature with convenience and simplicity.

Another object of the present invention is to provide a locker device which is inexpensive of construction and function and simple in its use and which is not prone to fall into disrepair and which may be provided for use on a mass basis and that will be secure and convenient.

A still further object of the present invention is to provide a locker device which is adaptable to and capable of mounting in a variety of locations and which is useful with a variety of cycle-type vehicles and which combines security against tampering with convenience and simplicity in construction.

Yet another object of the present invention is to provide a locker device as indicated which is capable of the functions referred to and which is based upon sound principles of construction and includes a locker in the form of a hollow container, locking means and a means for placing it into the surface upon which it is contemplated that such a device shall be located and including an opening to receive personal articles.

A still additional object of the present invention is to provide an alternative embodiment of construction such as to include a cover which will protect the bicycle or motorcycle or other cycle-type vehicles from the rigors of the common natural elements as well as granting extended relief from tampering with common tools and to provide greater security.

Other objects will appear hereinafter.

SUMMARY OF THE INVENTION

In accordance with the present invention, a device in the form of a locker is employed which is in the nature of a hollow container and includes a top, bottom, sides and ends as well as at least one opening to receive articles and a door to cover the opening and receive the locking means and lock mechanism wherein that locking means is attached to the locker and to the vehicle to be secured and is subsequently further secured to a means for implanting the locker device in the surface upon which it is to be located, and which includes specific structural means designed to render the opening and door covering secure against tampering with common, simple, minor tools.

An alternative embodiment in the present invention involves the addition of a cover arrangement designed to give increased security as well as protection for the vehicle from the common natural elements and includes a cover system with a top and side designed to cooperate with the locker construction itself and which is designed to be movable in relation to the locker construction so that the vehicle can enter and the cover can be folded down and across and over the vehicle as well as the end of the locker to cooperate therewith.

BRIEF DESCRIPTION OF THE DRAWINGS

For a more complete understanding of my invention, reference will be made to the attached drawing figures forming a part of the present application. The drawing figures are comprised of the following:

FIG. 1 is a perspective view of the locker device of the present invention.

FIG. 2 is a front view of the locker device.

FIG. 3 is a side view of the locker device.

FIG. 4 is a bottom view of the locker device.

FIG. 5 is a sectional view taken along Section line A—A of FIG. 4.

DETAILED DESCRIPTION OF THE DRAWINGS

Figure 6:
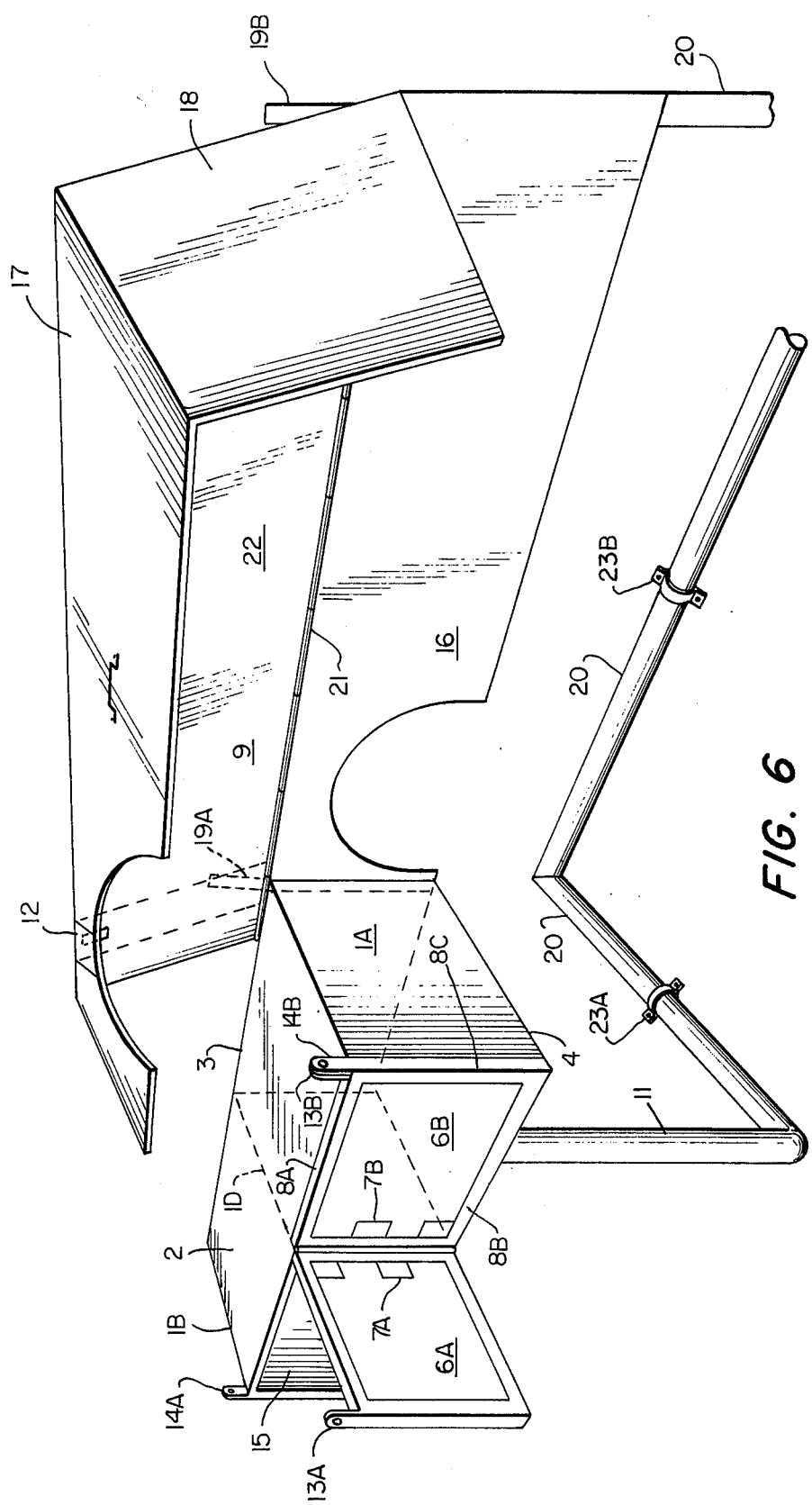
FIG. 6 is a perspective view of the embodiment of the invention which includes a cover.

It is anticipated that the locker device of the present invention will be constructed of any material substantial enough to resist break-ins with and tampering by common ordinary, simple tools normally carried by motorists and cyclists for their use in minor repair to their vehicles and to resist, as well, the normal elements such as rain, snow, hail and the like. As well, the material used may be substantially fireproof in order to render protection against this hazard.

It is anticipated that the present device will be used and employed in automobile parking area type situations with the use of an attendant or coin operated collection drops.

It is anticipated that the locker device will be anchored into the ground surface whether it be of earth, concrete, asphalt or whatever type surface.

Alternatively, a cover cooperating with the locker and attached thereto in a movable fashion will fold away and then back across the end of the locker to cooperate with elements identified hereinafter.

Referring now to the figures of the drawings and to the details of the construction and function of the present invention, it should be noted that numerals 1–23 comprise the various parts of the device. Particularly number 15 represents the container, numeral 1a and 1b are the left and right end portions of the container 15, as identified from a position facing the doors 6a and 6b. One of the doors may be securely fastened such as door 6b while the other is more frequently used as the opening to receive various articles to be placed within the locker. By use of a partition 10, the container may be divided longitudinally where the doors meet, thus permitting a single device to accommodate two vehicles. Moreover, the door 6a, it is anticipated, will be employed, through opening 14, therein to cooperate with opening 13 and end 1b so as to receive a lock mechanism of any known kind, and the locking means 9. Numeral 2 refers to the top of the locker while numeral 4 refers to the bottom and numeral 3 refers to the sides. One side 3, of course will be comprised of the doors 6a and 6b.

A reinforcement support element 5 represents a structure, such as a plate of metal or the like, designed to reinforce the point where the locker is attached to the base or stand 11 which point may be a pole, tube or the like constructed of any strong material which is designed to be inserted into the ground or other surface upon which the locker device is to be located.

Parts 7a and 7b are the hinges attached to the container doors to permit their movement in a verticle plane. The locking means 9 is designed to cooperate with any known locking mechanism for attachment through openings 13 and 14 in the end 1b and the door 6a, respectively. While one end of the locking means cooperates with the lock in said openings 13 and 14, the other end is attached to an anchor element 12a and 12b which is securely fitted into the support 11. It is anticipated that 9 will pass through the vehicle as represented in FIG. 1.

A most important and critical feature of the present invention is the angle elements 8a, 8b, 8c which are located around the periphery of the container portion which defines the opening and on the interior periphery of the door or doors designed to cover the opening or openings with a design and construction such that when the door is in a closed position, entry there-through with with the common repair tools such as a screwdriver, wrench, pliers or the like is substantially prevented. These angle parts 8a, 8b, 8c, are reinforcement pieces located angularly along the periphery of the doors so that when placed in a closed facing relationship they exclude any opening space through which a pry element such as a screwdriver, pliers or wrench might be inserted.

In the operation and function of the present locker device, a person desiring to park a cycle-type vehicle would place in proximate relationship to the locker device, the cover and pull it over the vehicle, whereupon 12a or 12b slips over protruding holes 14a or 14b which are part of doors 6a or 6b and side plates 1a or thereby securing both vehicle and locker by any known lock mechanism to the container 15 by openings 13. Prior to locking cover 9 to the door 6b and end of the locker, personal items such as a helmet, golves or purchases or the like may be conveniently placed in the container 15 itself. The overall dimensions of the locker device may be adapted and suited to any particular needs. It is comtemplated that the container portion 15 shall be large enough to contain personal articles such as a helmet, gloves or the like but not so large as to become cumbersome. When the door is closed in a faced relationship with periphery of the opening it covers and the lock mechanism attached, a secure environment is created not only for the personal articles within the locker on the locking device but also for the vehicle attached thereto.

Figure 9:
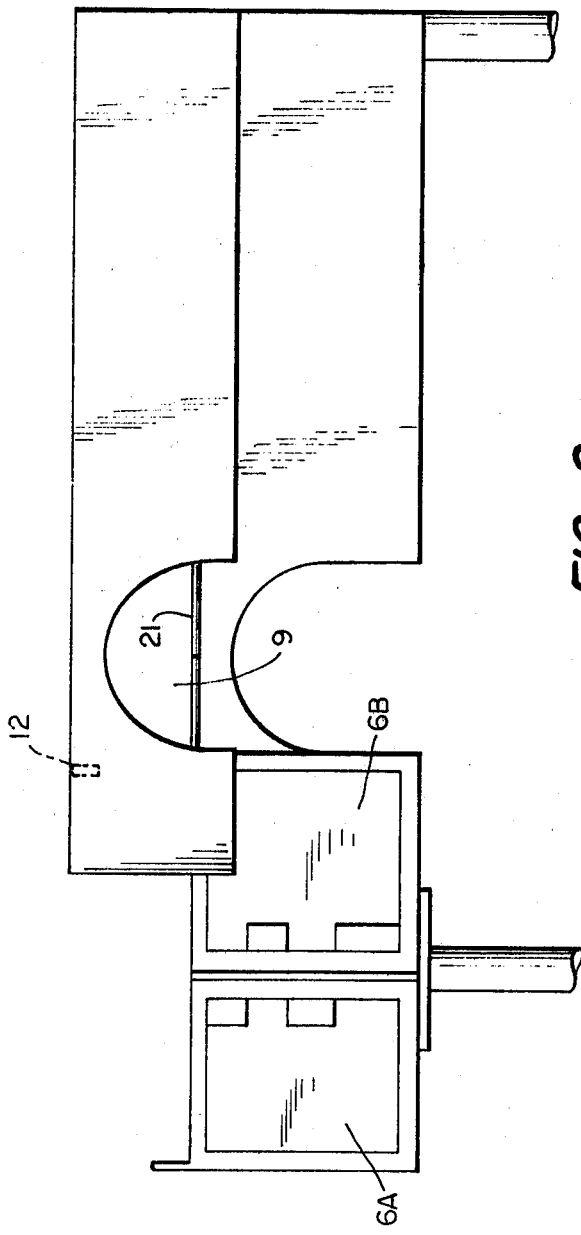
FIG. 9 is a front view of the embodiment in FIG. 6.
Figure 7:
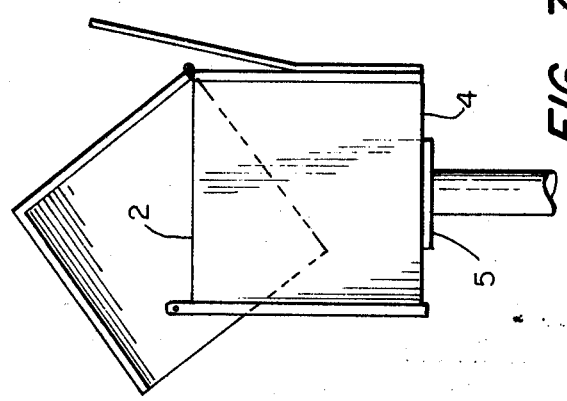
FIG. 7 is an end view of the embodiment in FIG. 6.
Figure 10:
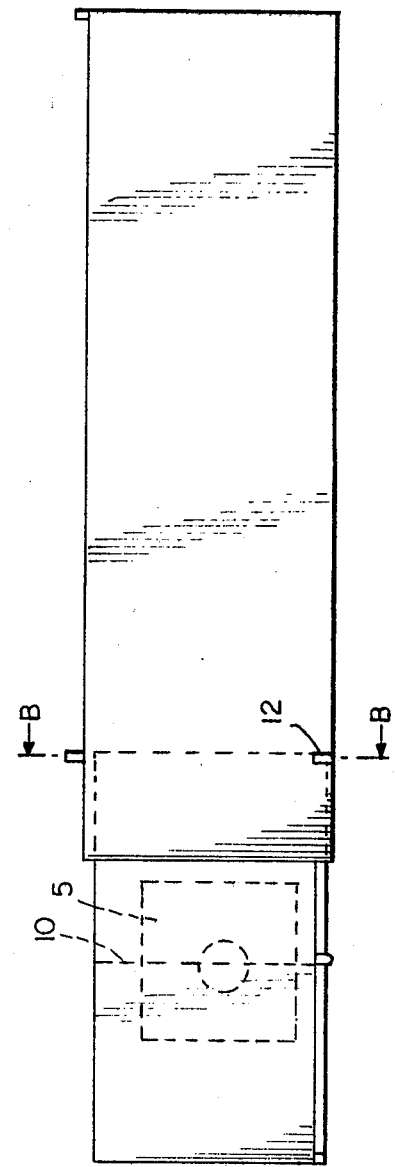
FIG. 10 is a plan view of the embodiment of FIG. 6.
Figure 8:
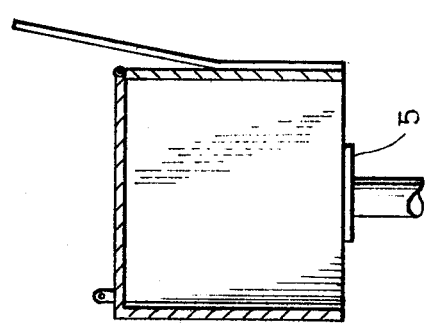
FIG. 8 is a sectional view of the embodiment in FIG. 6 taken along Section line B—B of FIG. 10.

An alternative embodiment of the invention can be seen in FIGS. 6 through 10 which describe a cover having an end 18, side 17 and another side 16 with 19A being a vehicle cover rest when the cover is in an open or disengaged position and 19B being a vehicle cover rest of the same type. Numeral 20 represents the vehicle cover support and numeral 21 is the juncture of side 16 and the roof 22. Numerals 23A and 23B represent the anchoring means for support 20.

Numerals 13A and 14A represent eyelets as do numerals 13B and 14B. Numerals 12A and 12B represent a locking means designed to cooperate respectively with 13A, 13B, and 14B.

In operation, the vehicle cover will pass over top of the vehicle extending from the end of the locker and locking means 12A and 12B will pass over eyelets 13A, 13B, and 14B respectively.

From the foregoing, it may be seen that I have provided a useful device which is employed to secure vehicles and personal items, especially in open spaces. The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the aforegoing description and all changes which come within the meaning and range of equivalency of the claims is therefore intended to be embraced therein.

What is claimed is:

1. A locker device comprising a container composed of a top, botton, side and end elements located in spaced relation to form an enclosure wherein one side is comprised of at least one door to cover an opening adapted to receive articles of varying size, a support element extended vertically from the locker, a locking means, a cover means including a top, sides and end attached to and extending from the side and top.

2. A locking device according to claim 1 wherein the cover contains a locking means located therein and adapted to cooperate with openings contained in extensions directed from the door and end elements.

3. A locking device according to claim 2 wherein a reinforcement plate is located at the junction of container and the support means.

4. A locker device according to claim 3 wherein a center plate divides the container compartment into two separate areas and wherein angle elements are located along the periphery of the door as well as the periphery of the end, top and botton of the locker which form the opening that the door covers.

* * * * *